United States Patent
Hamaya et al.

(10) Patent No.: US 9,551,059 B2
(45) Date of Patent: Jan. 24, 2017

(54) RARE EARTH FLUORIDE SPRAY POWDER AND RARE EARTH FLUORIDE-SPRAYED ARTICLE

(71) Applicant: SHIN-ETSU CHEMICAL CO., LTD., Tokyo (JP)

(72) Inventors: Noriaki Hamaya, Echizen (JP); Takao Maeda, Echizen (JP); Yasushi Takai, Echizen (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 0 days.

(21) Appl. No.: 14/691,187

(22) Filed: Apr. 20, 2015

(65) Prior Publication Data
US 2015/0225832 A1 Aug. 13, 2015

Related U.S. Application Data

(62) Division of application No. 13/673,113, filed on Nov. 9, 2012, now abandoned.

(30) Foreign Application Priority Data

Nov. 10, 2011 (JP) ................................. 2011-246164

(51) Int. Cl.
C23C 4/04 (2006.01)
C01F 17/00 (2006.01)
C23C 4/10 (2016.01)

(52) U.S. Cl.
CPC ............... *C23C 4/04* (2013.01); *C01F 17/00* (2013.01); *C01F 17/0062* (2013.01); *C23C 4/10* (2013.01); *C01P 2004/54* (2013.01); *C01P 2004/61* (2013.01); *C01P 2006/11* (2013.01); *C01P 2006/80* (2013.01); *C01P 2006/82* (2013.01); *Y10T 428/256* (2015.01); *Y10T 428/2982* (2015.01)

(58) Field of Classification Search
None
See application file for complete search history.

(56) References Cited

U.S. PATENT DOCUMENTS

| | | | |
|---|---|---|---|
| 6,685,991 B2 | 2/2004 | Wataya et al. | |
| 6,852,433 B2 | 2/2005 | Maeda | |
| 2002/0015853 A1 | 2/2002 | Wataya et al. | |
| 2002/0160189 A1 | 10/2002 | Wataya et al. | |
| 2002/0177014 A1 | 11/2002 | Kaneyoshi et al. | |
| 2004/0062696 A1* | 4/2004 | Kikuyama et al. | ........... 423/210 |
| 2007/0077363 A1 | 4/2007 | Kitamura et al. | |
| 2007/0151632 A1* | 7/2007 | Komuro et al. | .............. 148/300 |
| 2008/0115725 A1 | 5/2008 | Ibe et al. | |

FOREIGN PATENT DOCUMENTS

| | | |
|---|---|---|
| JP | 3523222 B2 | 4/2004 |
| JP | 4006596 B2 | 11/2007 |
| JP | 2008-133528 A | 6/2008 |

* cited by examiner

*Primary Examiner* — Ronak Patel
(74) *Attorney, Agent, or Firm* — Westerman, Hattori, Daniels & Adrian, LLP

(57) ABSTRACT

A powder comprising rare earth element fluoride particles having an aspect ratio of up to 2, an average particle size of 10-100 μm, a bulk density of 0.8-1.5 g/cm³, and a carbon content of 0.1-0.5 wt % is amenable to atmospheric plasma spraying. An article obtained by spraying the rare earth fluoride spray powder to a substrate undergoes few partial color changes and performs well even when used in a halogen gas plasma.

4 Claims, No Drawings

RARE EARTH FLUORIDE SPRAY POWDER AND RARE EARTH FLUORIDE-SPRAYED ARTICLE

CROSS-REFERENCE TO RELATED APPLICATION

This application is a divisional of U.S. application Ser. No. 13/673,113, filed on Nov. 9, 2012 which is based upon and claims the benefit of priority 35 U.S.C. §119(a) from the prior Patent Application No. 2011-246164 filed in Japan on Nov. 10, 2011, the entire contents of which are hereby incorporated by reference.

TECHNICAL FIELD

This invention relates to a rare earth element fluoride thermal spray powder, especially suited for use to form a sprayed coating having corrosion resistance in a halogen-based corrosive gas plasma atmosphere as encountered in the semiconductor device fabrication process, and a rare earth element fluoride-sprayed article.

BACKGROUND ART

In the prior art, sprayed coatings having corrosion resistance are used for protecting substrates in a variety of service environments. While aluminum, chromium and similar metal oxides are often used as the thermal spray material, these spray materials are inadequate for use in the semiconductor fabrication process which may include exposure to hot plasma, corrosive attacks, and in particular, treatment in a halogen-based corrosive gas plasma atmosphere.

The halogen-based corrosive gas plasma atmosphere used in the fabrication of semiconductor devices contains fluorine gases such as $SF_6$, $CF_4$, $CHF_3$, $ClF_3$ and HF and chlorine gases such as $Cl_2$, $BCl_3$ and HCl.

Known articles which can be used in such extremely corrosive atmospheres include, for example, articles having corrosion resistant coatings obtained by spraying yttrium oxide (Patent Document 1) and yttrium fluoride (Patent Document 2) to their surface. While rare earth oxide sprayed articles are generally prepared by plasma spraying rare earth oxide, they are long used as the sprayed articles in the industrial semiconductor fabrication process because of least technical problems. On the other hand, the rare earth fluoride sprayed coatings suffer from a technical problem despite good corrosion resistance. The plasma spraying of rare earth fluoride has the problem that when the rare earth fluoride is passed through a flame at 3,000° C. or higher for melting, the fluoride can be decomposed so that the material partially converts to a mixture of rare earth fluoride and rare earth oxide. For this reason, practical utilization of rare earth fluoride sprayed articles is delayed as compared with the rare earth oxide sprayed articles.

CITATION LIST

Patent Document 1: JP 4006596 (U.S. Pat. No. 6,852,433)
Patent Document 2: JP 3523222
Patent Document 3: JP-A 2008-133528 (US 20080115725)

SUMMARY OF INVENTION

An object of the invention is to provide a rare earth element fluoride thermal spray powder which is used to form rare earth fluoride sprayed coatings having greater corrosion resistance than conventional rare earth oxide sprayed coatings, and a sprayed article having a rare earth fluoride sprayed coating.

The inventors have found that a rare earth element fluoride spray powder comprising rare earth element fluoride particles having an aspect ratio of up to 2 as shape index, an average particle size of 10 to 100 μm, a bulk density of 0.8 to 1.5 $g/cm^3$, and a carbon content of 0.1 to 0.5% by weight is effective for plasma spraying; and that better results are obtained by plasma spraying the rare earth element fluoride spray powder onto a substrate such that the sprayed coating may have a carbon content of up to 0.1% by weight and an oxygen content of 0.3 to 0.8% by weight.

In one aspect, the invention provides a rare earth element fluoride spray powder comprising rare earth element fluoride particles having an aspect ratio of up to 2, an average particle size of 10 to 100 μm, a bulk density of 0.8 to 1.5 $g/cm^3$, and a carbon content of 0.1 to 0.5% by weight.

Preferably, the total content of water and hydroxyl group is up to 10,000 ppm in the spray powder.

Typically, the rare earth element is selected from among Y, 3A Group elements from La to Lu, and mixtures thereof. More preferably the rare earth element is Y, Ce or Yb.

In another aspect, the invention provides a rare earth element fluoride sprayed article comprising a substrate and a sprayed coating which is deposited on the substrate by plasma spraying the spray powder defined above, the sprayed coating having a carbon content of up to 0.1% by weight and an oxygen content of 0.3 to 0.8% by weight.

Preferably, the sprayed coating has a L*a*b* color space chromaticity with a L* value of 65 to 85, an a* value of −3.0 to +3.0, and a b* value of 0.0 to +8.0.

ADVANTAGEOUS EFFECTS OF INVENTION

The rare earth element fluoride spray powder defined herein is amenable to atmospheric plasma spraying. An article obtained by spraying the rare earth element fluoride spray powder to a substrate undergoes few partial color changes and performs well until its own long life even when used in a halogen gas plasma.

DESCRIPTION OF PREFERRED EMBODIMENTS

One embodiment of the invention is a rare earth element fluoride thermal spray powder comprising rare earth element fluoride particles having an aspect ratio of up to 2 as shape index, an average particle size of 10 μm to 100 μm, a bulk density of 0.8 $g/cm^3$ to 1.5 $g/cm^3$, and a carbon content of 0.1% to 0.5% by weight. This thermal spray powder is effective for plasma spraying a rare earth element fluoride in air. In general, the thermal spray powder should desirably meet the requirements including (1) smooth flow and (2) that the material is not decomposed by plasma spraying. The rare earth element fluoride spray powder defined herein has these advantages.

The thermal spray powder should preferably comprise particles of spherical shape. When a spray powder is fed into a flame for thermal spraying, a poor fluidity may make the powder inconvenient to feed such as by clogging a feed tube. To ensure smooth flow, the spray powder should preferably consist of spherical particles. The particles have an aspect ratio of up to 2, preferably up to 1.5. The "aspect ratio" is used herein as one shape index of the three dimensions and refers to a ratio of length to breadth of a particle.

The rare earth element used in the rare earth element fluoride spray powder may be selected from among yttrium (Y) and 3A Group elements inclusive of lanthanum (La) to lutetium (Lu). Of these, yttrium (Y), cerium (Ce) and ytterbium (Yb) are preferred. A mixture of two or more rare earth elements is also acceptable. When such a mixture is used, the spray powder may be obtained by granulating a mixture of raw materials, or by granulating particles of a single element and mixing such particles of different elements prior to use.

The spray powder has an average particle size of 10 to 100 μm, preferably 30 to 60 μm. The size of particles is preferably in a range from 20 μm to 200 μm. As used herein, the average particle size is determined as a weight average value $D_{50}$ (i.e., a particle diameter or median diameter when the cumulative weight reaches 50%) by a particle size distribution measurement unit based on the laser light diffractometry. If the size of spray particles is too small, such particles may evaporate in the flame, resulting in a lower yield of spraying. If the size of spray particles is too large, such particles may not be completely melted in the flame, resulting in a sprayed coating of deteriorated quality.

Particles as granulated to constitute the spray powder should be solid, i.e., filled to the interior (or free of voids), because solid particles are stable (or do not chip or collapse) during handling, and because the problem arising from voids in particles that undesirable gas component can be trapped in voids is avoidable. In this respect, the spray powder should have a bulk density of 0.8 to 1.5 g/cm$^3$, preferably 1.2 to 1.5 g/cm$^3$. The bulk density is measured by the method of JIS K 5101 12-1.

The atmospheric plasma spraying of rare earth fluoride has a possibility that the fluoride is decomposed into oxide. Particularly when the spray powder contains a noticeable amount of water and/or hydroxyl group, it facilitates decomposition of the fluoride into a rare earth oxide and the liberated fluorine forms a gas such as hydrogen fluoride. The resulting sprayed coating becomes a mixture of rare earth oxide and rare earth fluoride. In this regard, the raw material to be granulated into the spray powder should preferably have the total content of water and hydroxyl group of up to 10,000 ppm, more preferably up to 3,000 ppm, and even more preferably up to 1,000 ppm.

Also when the spray powder contains 0.1 to 0.5% by weight of carbon, carbon combines with oxygen to form carbon dioxide, which prevents decomposition of the rare earth fluoride. This results in a rare earth fluoride sprayed coating having a minimal content of rare earth oxide.

The spray powder comprising a rare earth element fluoride may be prepared, typically by dispersing a rare earth element fluoride in a solvent such as water or an alcohol of 1 to 4 carbon atoms to form a slurry having a concentration of 10 to 40% by weight, granulating the slurry by spray drying or atomization technique, and drying at a temperature of 70 to 200° C. in air, vacuum or inert gas atmosphere for the purpose of removing any concomitant water from particles.

Alternatively, the spray powder may be prepared by mixing a rare earth element fluoride with an organic polymer such as carboxymethyl cellulose serving as a binder and deionized water to form a slurry, and granulating the slurry by spray drying or atomization technique. Examples of the binder used herein include carboxymethyl cellulose, polyvinyl alcohol, and polyvinyl pyrrolidone. The binder is typically added in an amount of 0.05 to 10% by weight based on the weight of the rare earth element fluoride to form a slurry. Since the binder can serve as a carbon source, the binder is preferably held in the spray powder (i.e., not burnt out).

Since it is preferred to remove only water from the granulated particles, but not the binder, as mentioned just above, the granulated particles may be dried at a temperature below 200° C. rather than firing in an oxygen-containing atmosphere. Drying at a temperature below 200° C. in vacuum or inert gas is preferred.

By plasma spraying the thus obtained spray powder to a substrate, a rare earth fluoride sprayed article is obtainable. The sprayed coating formed on the substrate should have a carbon content of up to 0.1% by weight, preferably 0.03 to 0.1% by weight and an oxygen content of 0.3 to 0.8% by weight, preferably 0.45 to 0.65% by weight.

Thermal spraying to a component of the semiconductor equipment is desirably atmospheric plasma spraying or vacuum plasma spraying. The plasma gas used herein may be nitrogen/hydrogen, argon/hydrogen, argon/helium, argon/nitrogen, argon alone, or nitrogen gas alone, but not limited thereto. Examples of the substrate subject to thermal spraying include, but are not limited to, substrates of aluminum, nickel, chromium, zinc, and alloys thereof, alumina, aluminum nitride, silicon nitride, silicon carbide, and quartz glass which constitute components of the semiconductor equipment. The sprayed coating typically has a thickness of 50 to 500 μm. The conditions under which the rare earth fluoride powder is thermally sprayed are not particularly limited. The thermal spraying conditions may be determined as appropriate depending on the identity of substrate, a particular composition of the rare earth fluoride spray powder, and a particular application of the resulting sprayed article.

The sprayed article, specifically the sprayed coating has a chromaticity in the L*a*b* color space with a L* value of 65 to 85, an a* value of −3.0 to +3.0, and a b* value of 0.0 to +8.0, preferably a L* value of 70 to 75, an a* value of 0 to 1, and a b* value of 4 to 7. The color of the rare earth fluoride sprayed coating varies with the decomposition state of the fluoride and the carbon content in the sprayed coating. Once the L*a*b* color space chromaticity is specified, the state of the sprayed coating is approximately recognizable in terms of appearance color tone. The L*a*b* color space chromaticity may be measured according to JIS Z-8729, for example, by Color Meter CR-200 (Minolta Co., Ltd.).

EXAMPLE

The following Examples and Comparative Examples are provided to illustrate the invention and are not intended to limit the scope thereof.

Example 1

Particulate yttrium fluoride having an average particle size of 5 μm and a water/hydroxyl content of 1,000 ppm, 5 kg, was added to deionized water and agitated to form a 30 wt % slurry. The slurry was granulated through a spray dryer into spherical particles having an average particle size of about 40 μm.

The granulated particles were heated in air at 100° C. for 2 hours, obtaining a dry powder of spherical particles. The water content of the granulated powder was measured, finding a water content of about 0.65 wt %. The water content was measured by Karl Fischer's water analysis. On further analysis, the granulated powder had a carbon content of 0.3 wt %, an aspect ratio of 1.2, and a bulk density of 1.3 g/cm³. This yttrium fluoride powder was adequate as the thermal spray material. Notably, the aspect ratio was determined by taking a SEM photo, measuring the length and breadth of 180 particles in the photo, and averaging.

Example 2

Using the yttrium fluoride spray powder of Example 1 and a gas mixture of 40 L/min argon and 5 L/min hydrogen, atmospheric plasma spraying was carried out onto an aluminum substrate. The resulting article had a sprayed coating of about 200 μm thick and looked light gray color. The L*a*b* chromaticity of the sprayed coating was measured, finding L*=70.87, a*=0.35, and b*=5.57. It had a carbon content of 0.07 wt %, and an oxygen content of 0.75 wt %.

The sprayed article was mounted in a reactive ion plasma tester along with a resist-coated silicon wafer. A plasma exposure test was performed under conditions: frequency 13.56 MHz, plasma power 1,000 watts, gas mixture $CF_4+O_2$ (20 vol %), flow rate 50 mL/min, and gas pressure 50 mTorr. Following the exposure test, the sprayed coating showed no partial color changes on visual inspection. The L*a*b* chromaticity was measured, finding L*=70.33, a*=0.40, and b*=5.47.

Comparative Example 1

Particulate yttrium fluoride having an average particle size of 30 μm and a water/hydroxyl content of 1,000 ppm, 5 kg, was milled on a jet mill, obtaining yttrium fluoride having an average particle size of 3 μm. This particulate yttrium fluoride was added to deionized water and agitated to form a 30 wt % slurry. The slurry was granulated through a spray dryer into spherical particles having an average particle size of about 50 μm. The water content of the granulated powder was measured, finding a water content of about 1.2 wt %. The water content was measured by Karl Fischer's water analysis.

The granulated particles were heated in air at 800° C. for 2 hours, obtaining a powder of spherical particles. On analysis, the granulated powder had a carbon content of 0.01 wt %, an aspect ratio of 1.6, and a bulk density of 1.7 g/cm³. This yttrium fluoride powder was adequate as the thermal spray material. Notably, the aspect ratio was determined by taking a SEM photo, measuring the length and breadth of 180 particles in the photo, and averaging.

Comparative Example 2

Using the yttrium fluoride spray powder of Comparative Example 1 and a gas mixture of 40 L/min argon and 5 L/min hydrogen, atmospheric plasma spraying was carried out onto an aluminum substrate. The resulting article had a sprayed coating of about 200 μm thick and looked white. The L*a*b* chromaticity of the sprayed coating was measured, finding L*=91.50, a*=−0.35, and b*=−0.17. It had a carbon content of 0.005 wt %, and an oxygen content of 2.0 wt %.

The sprayed article was mounted in a reactive ion plasma tester along with a resist-coated silicon wafer. A plasma exposure test was performed under conditions: frequency 13.56 MHz, plasma power 1,000 watts, gas mixture $CF_4+O_2$ (20 vol %), flow rate 50 mL/min, and gas pressure 50 mTorr. Following the exposure test, some portions of the sprayed coating showed a color change to brown.

Japanese Patent Application No. 2011-246164 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A rare earth element fluoride sprayed article comprising a substrate and a sprayed coating which is deposited on the substrate by plasma spraying a spray powder comprising rare earth element fluoride particles having an aspect ratio of up to 2, an average particle size of 10 to 100 μm, a bulk density of 0.8 to 1.5 g/cm³, a carbon content of 0.1 to 0.5% by weight, and the total content of water and hydroxyl group of the rare earth element fluoride particles is up to 10,000 ppm, the sprayed coating having a carbon content of 0.03 to 0.1% by weight and an oxygen content of 0.3 to 0.8% by weight, and further having a L*a*b* color space chromaticity with a L* value of 65 to 85, an a* value of −3.0 to +3.0, and a b* value of 0.0 to +8.0.

2. The sprayed article of claim 1, wherein the rare earth element of the rare earth element fluoride particles is one or more elements selected from the group consisting of Y and 3A Group elements from La to Lu.

3. The sprayed article of claim 1, wherein the rare earth element of the rare earth element fluoride particles is selected from the group consisting of Y, Ce and Yb.

4. The sprayed article of claim 1 wherein the sprayed coating has a L*a*b* color space chromaticity with a L* value of 70 to 75, an a* value of 0 to 1, and a b* value of 4 to 7.

* * * * *